United States Patent [19]

Hackman et al.

[11] Patent Number: 5,788,212
[45] Date of Patent: Aug. 4, 1998

[54] PRESSURE RELIEF DEVICE WITH SHAPED MEMORY ALLOY THERMALLY ACTIVATED TRIGGER

[75] Inventors: Donald J. Hackman, Upper Arlington, Ohio; William D. Ingle, Park Ridge, Ill.; Thomas P. Groeneveld, Worthington, Ohio

[73] Assignee: Gas Research Institute, Chicago, Ill.

[21] Appl. No.: 687,743

[22] Filed: Jul. 26, 1996

[51] Int. Cl.$^6$ .................................................. F16K 31/02
[52] U.S. Cl. .................................................. 251/11; 251/66
[58] Field of Search .................................. 251/11, 66, 74

[56] References Cited

U.S. PATENT DOCUMENTS

| | | |
|---|---|---|
| Re. 29,614 | 4/1978 | Zehr . |
| 2,956,575 | 10/1960 | Ammann . |
| 3,464,433 | 9/1969 | Michaelsen . |
| 3,712,319 | 1/1973 | Rhodes et al. . |
| 3,842,853 | 10/1974 | Kelly et al. . |
| 3,974,844 | 8/1976 | Pimentel . |
| 4,064,890 | 12/1977 | Collins et al. . |
| 4,195,745 | 4/1980 | Roberts et al. . |
| 4,221,231 | 9/1980 | Harvey et al. . |
| 4,269,215 | 5/1981 | Odar . |
| 4,290,440 | 9/1981 | Sturgis . |
| 4,310,012 | 1/1982 | Billington et al. . |
| 4,549,717 | 10/1985 | Dewaegheneire ............ 251/11 X |
| 4,559,512 | 12/1985 | Yaeger et al. . |
| 4,645,489 | 2/1987 | Krumme et al. ............. 251/11 X |
| 5,048,554 | 9/1991 | Kremer . |
| 5,083,439 | 1/1992 | Omer et al. ................. 251/11 X |
| 5,161,738 | 11/1992 | Wass . |
| 5,213,128 | 5/1993 | Baird . |
| 5,588,717 | 12/1996 | Kim et al. .................. 251/11 X |

*Primary Examiner*—John Fox
*Attorney, Agent, or Firm*—Speckman Pauley Petersen & Fejer

[57] ABSTRACT

A pressure relief device that is thermally triggered by a shaped memory alloy element. The pressure relief device has a valve body with a passageway that is exposed on one end to a high pressure fluid and on another end to a low pressure fluid. A closure element is moveably mounted with respect to the valve body and operates between an open position and a closed position. In the closed position, the closure element preferably prevents communication between the high pressure fluid and the low pressure fluid. In the open position, the high pressure fluid is in communication with the low pressure fluid. The shaped memory alloy element either directly or indirectly interferes with movement of the closure element. The shaped memory alloy element preferably interferes with the closure element to retain the closure element in the closed position. Upon thermal activation, the shaped memory alloy element deforms and allows the closure element to move from the closed position toward the open position.

17 Claims, 2 Drawing Sheets

PRESSURE RELIEF DEVICE WITH SHAPED MEMORY ALLOY THERMALLY ACTIVATED TRIGGER

BACKGROUND OF THE INVENTION

1. Field of the Invention

This invention relates to a simplified pressure relief device that is triggered preferably by an elongated shaped memory alloy element deforming upon reaching a threshold temperature.

2. Description of Prior Art

Conventional pressure relief devices, such as those which are used with compressed natural gas cylinders for fueling vehicles, use thermally activated devices designed to relieve excess pressure from the cylinder in an emergency situation, such as a fire event. Conventional pressure relief devices often use eutectic materials that melt and thereby either trigger a mechanical linkage or open a passageway to vent the cylinder.

Many triggers for conventional pressure relief devices retain and release upon demand spring-loaded or pressure loaded valves or plungers. A fire event produces sufficient heat to melt eutectic material so that the eutectic material can flow out of a valve body, often with pressure or spring forces assisting. Eutectic materials are often associated with relatively long reaction times and expose only a small, long passageway that can restrict a flowrate of vented fluid thereby causing relatively slow venting in an emergency situation.

Many conventional pressure relief devices have thermal triggers contained within a valve body of the pressure relief device. Conventional pressure relief devices that use a thermal trigger within the valve body require relatively slow conduction heat transfer through the valve body before the eutectic material melts and allows the fluid to vent from the cylinder. Excessive heat transfer to the valve body can damage the pressure relief device and allow highly combustible fluid to escape or vent through the trigger device.

Conventional pressure relief devices are often located at one end of a pressurized cylinder and thus heat generated by a fire, for example near a middle portion or at an opposite end of the cylinder, must be conducted through the cylinder and to the pressure relief device before the trigger mechanism functions. Many pressurized cylinders are constructed of composite materials which have a relatively low thermal conductivity and thus can result in relatively long response times for the pressure relief devices to operate. Excessive heat transfer to the pressurized cylinder without releasing pressurized fluid within the cylinder can defeat the purpose of a pressure relief device and result in an explosion.

U.S. Pat. No. 3,464,433 teaches a normally-open valve that moves into a closed position when a remote thermal activation device is triggered. The thermal activation device includes a rod held in place by a fusible metal alloy of a type normally used in fusible links for fire protection. One end of the rod is connected to a Bowden cable. The opposite end of the Bowden cable is directly connected to a valve member.

U.S. Pat. No. 3,974,844 discloses a valve device that is remotely operated by transmitting electrical power through a wire that deforms from a greater length to a shorter original or memory length when a selected current is applied to the wire, heating the wire to above a transition temperature. When the wire cools it returns to the greater natural length. The wire is directly connected to a valve stem that is connected to a valve plug.

U.S. Pat. No. 2,956,575 teaches a thermostatic valve which is normally-open and closes upon structural release of a bi-metallic member. The bi-metallic member engages a shoulder formed in a lower portion of a valve stem. When the bi-metallic member reaches a set temperature, the bi-metallic member moves away from the engaged position with the shoulder.

U.S. Pat. No. 5,161,738 teaches a thermally activated relief valve which upon reaching a set temperature triggers a bayonet that moves and pierces a diaphragm. The thermal trigger is activated by melting a eutectic material.

SUMMARY OF THE INVENTION

It is one object of this invention to provide a simplified pressure relief device with relatively few moving parts.

It is another object of this invention to provide a pressure relief device with a thermal trigger mechanism that depends either directly or indirectly upon deformation of a shaped memory alloy element.

It is still another object of this invention to provide a pressure relief device that can be thermally triggered from a local and/or a remote location.

It is yet another object of this invention to provide a pressure relief device that immediately opens a relatively large passageway through which vented fluid flows when the pressure relief device is thermally triggered.

The above and other objects of this invention are accomplished with a pressure relief device that has a valve body. The valve body forms a passageway having one end exposed to a high pressure fluid and an opposite end exposed to a low pressure fluid. A closure element moves between an open position and a closed position. In the open position, the high pressure end is in communication with the low pressure end. In the closed position, the closure element prevents communication between the high pressure end and the low pressure end.

A thermal triggering mechanism of the pressure relief device, according to this invention, is triggered by deformation of a shaped memory alloy element. In one preferred embodiment according to this invention, the shaped memory alloy element deforms upon reaching a set temperature. The shaped memory alloy element is preferably elongated and shortens when heated to a set temperature. In one preferred embodiment, the shaped memory alloy element itself interferes with movement of the closure element. In another preferred embodiment, the shaped memory alloy element is mechanically linked to another suitable element, such as a rod or cable, that interferes with the closure element. The interference either directly or indirectly retains the closure element in the closed position.

As the shaped memory alloy element deforms, the interference is eliminated and the closure element is free to move with respect to the valve body. Either a pressure force, a spring force or another suitable bias force urges the closure element toward the open position when the interference is eliminated.

The pressure relief device according to this invention has relatively few moving parts and is much more reliable than conventional pressure relief devices. Movement of the closure element from the closed position to the open position preferably exposes a relatively large passageway that accommodates a relatively high flowrate of vented fluid. Because of the consistency and dependability of shaped memory alloy materials, the thermal triggering mechanism of the pressure relief device according to this invention provides an extremely safe design. Pressure relief devices play an extremely important role in present and future use of compressed natural gas cylinders, such as for many vehicles. In a fire situation, it is extremely important to depend upon a thermal triggering mechanism that quickly releases pressurized fuel.

BRIEF DESCRIPTION OF THE DRAWINGS

These and other features of this invention will be better understood when viewed in light of the following detailed description taken in conjunction with the drawings wherein.

DESCRIPTION OF PREFERRED EMBODIMENTS

Figure 1:
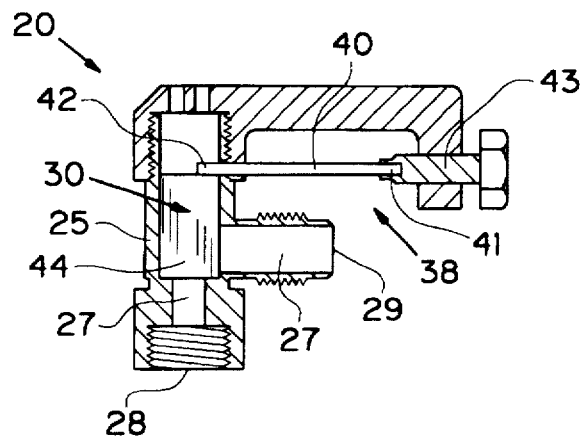
FIG. 1 is a partial cross-sectional view of a pressure relief device in a closed position, according to one preferred embodiment of this invention, with a local thermal triggering mechanism.
Figure 2:
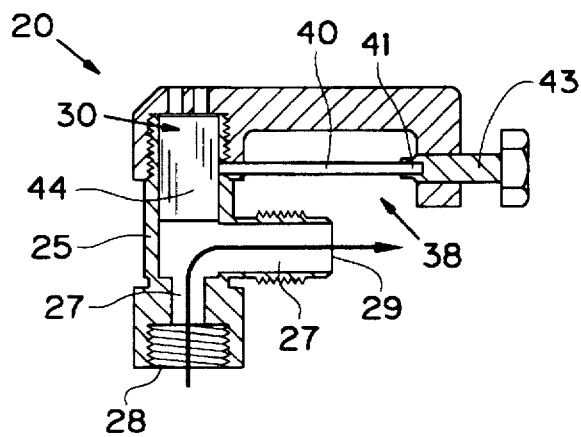
FIG. 2 is a partial cross-sectional view of the pressure relief device as shown in FIG. 1, but in an open position.

Referring to FIG. 1, pressure relief device (PRD) 20 according to this invention comprises valve body 25 that has passageway 27. As shown in FIG. 2, passageway 27 forms a side port discharge through which vented pressurized fluid flows. It is apparent that this invention is not limited to such arrangement of passageway 27 but can accommodate any other passageway that allows pressurized fluid to flow from high pressure end 28 to low pressure end 29.

Figure 3:
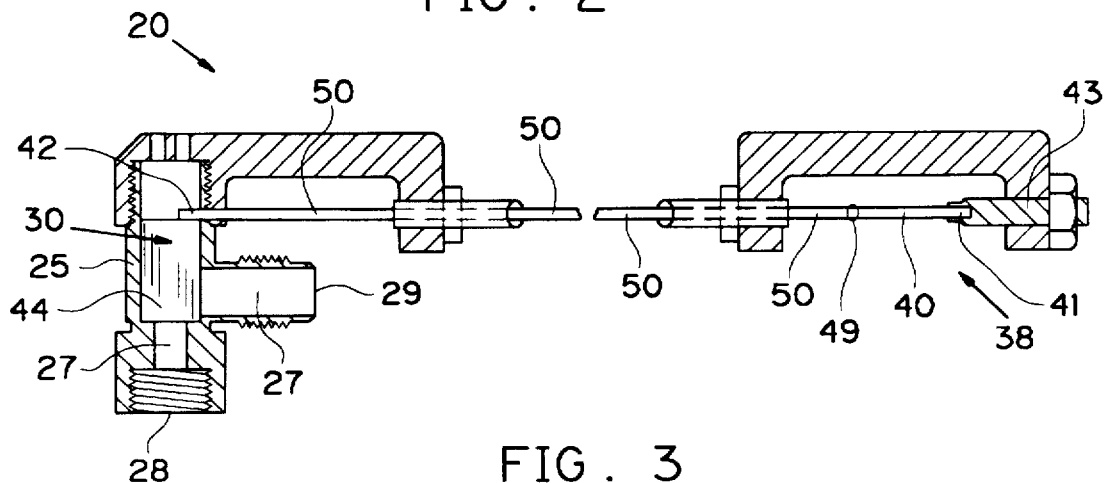
FIG. 3 is a partial cross-sectional view of a pressure relief device in a closed position, according to another preferred embodiment of this invention, with a remote thermal triggering mechanism.
Figure 4:
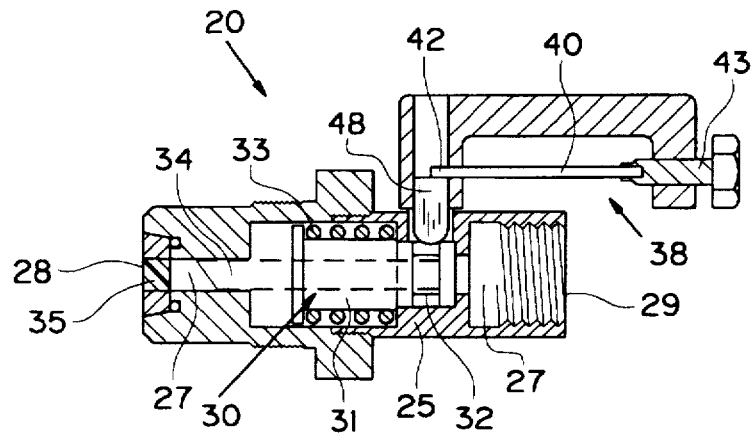
FIG. 4 is a partial cross-sectional view of a pressure relief device in a closed position, according to another preferred embodiment of this invention, with a local thermal triggering mechanism.
Figure 5:
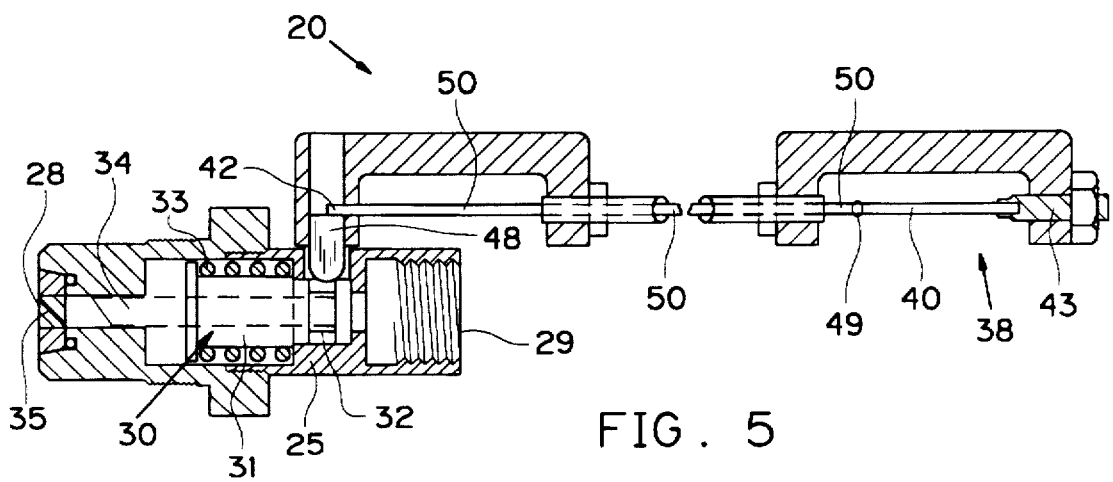
FIG. 5 is a partial cross-sectional view of the pressure relief device in the closed position, as shown in FIG. 4, but with a remote thermal triggering mechanism.

FIGS. 1 and 2 show one preferred embodiment of this invention in which thermal triggering mechanism 38 is positioned local with respect to valve body 25. FIG. 3 shows another preferred embodiment of this invention wherein valve body 25 is similar to the embodiment shown in FIGS. 1 and 2, but thermal triggering mechanism 38 is positioned remote with respect to valve body 25. FIGS. 4 and 5 show another preferred embodiment of valve body 25. FIGS. 4 and 5 show a local position and a remote position, respectively, of thermal triggering mechanism 38 with respect to valve body 25.

Referring to FIGS. 1-3, closure element 30 moves with respect to valve body 25 between a closed position, as shown in FIG. 1, and an open position, as shown in FIG. 2. As shown in FIGS. 1-3, closure element 30 comprises piston 44. Piston 44 preferably has a circular cross section and is free to slide and rotate with respect to valve body 25. It is apparent that piston 44 can have any other suitable cross-sectional shape.

As shown in FIG. 1, in the closed position piston 44 blocks passageway 27 and thus prevents communication between high pressure end 28 and low pressure end 29. In the open position as shown in FIG. 2, piston 44 is moved from the closed position shown in FIG. 1, thereby opening passageway 27 and allowing high pressure end 28 to communicate with low pressure end 29. It is apparent that different suitable designs and travel distances of closure element 30 can be selected to control flow parameters through PRD 20.

According to preferred embodiments of this invention, PRD 20 comprises shaped memory alloy element 40, as clearly shown in FIGS. 1-3. Shaped memory alloy materials are known to those persons skilled in the art, as offering predictable, reliable and consistent deformations or changes in shape. Shaped memory materials often comprise a series of alloys, such as nickel and titanium, and exhibit a unique property referred to as memory shape, by annealing the alloy material into a desired shape. Once deformed, shaped memory alloy element 40 can be trained to return to the memory shape by heat transfer. Shaped memory alloy element 40 can be designed to exert considerable forces and thus accomplish significant work as it returns to the memory shape. As memory alloy element 40 cools it returns to its natural shape. Shaped memory alloy element 40, according to this invention, has a faster response time and greater structural strength than conventional eutectic metals. The work output derived from shaped memory alloy element 40 of this invention is greater than the work output derived from conventional bi-metal elements.

As clearly shown in FIG. 1, in the closed position shaped memory alloy element 40 interferes with movement of closure element 30, with respect to valve body 25. It is apparent that shaped memory alloy element 40 can either directly interfere with closure element 30, as shown in FIG. 1, or indirectly interfere with closure element 30, as shown in FIG. 3. As used throughout this specification and in the claims, the phrase direct interference is intended to relate to shaped memory alloy element 40 directly abutting or contacting closure element 30, such as shown in FIG. 1. Also as used throughout this specification and in the claims, the phrase indirect interference is intended to relate to shaped memory alloy element 40 being mechanically linked to another element, such as elongated flexible element 50 as shown in FIG. 3. It is apparent that elongated flexible element 50 can be a sheathed cable, a rod or any other suitable elongated element that transfers motion.

FIG. 2 shows shaped memory alloy element 40 shortened with respect to the length shown in FIG. 1. According to one preferred embodiment of this invention, the reduced length is accomplished by heating shaped memory alloy element 40 to a set temperature at which shaped memory alloy element 40 returns to its memory shape. The generated forces move shaped memory alloy element 40 so that interference with closure element 30 is eliminated, as shown in FIG. 2. Eliminating the interference allows closure element 30 to move toward and/or into the open position in which pressurized fluid vents through passageway 27, as shown by the arrow in FIG. 2.

As shown in FIGS. 1, 2 and 4, thermal triggering mechanism 38 is positioned local with respect to valve body 25. As shown in FIGS. 3 and 5, thermal triggering mechanism 38 is positioned remote with respect to valve body 25. Thus, depending upon the particular design conditions, thermal triggering mechanism 38 can be positioned anywhere with respect to a pressurized vessel on which PRD 20 is mounted. It may be more desirable to position thermal triggering mechanism 38 at a location where the most heat is generated, such as in a localized fire condition.

FIGS. 4 and 5 show another preferred embodiment of PRD 20, according to this invention. Thermal triggering mechanism 38 of this invention can be used to indirectly interfere with closure element 30. As shown in FIG. 4 and 5, plunger 48 is slidably mounted with respect to valve body 25. In the closed position, plunger 48 preferably interferes with closure element 30. As shown in FIGS. 4 and 5, at least a portion of plunger 48 projects within groove 32 of closure element 30. As shown in FIG. 4, shaped memory alloy element 40 directly interferes with, and abuts, plunger 48. As shown in FIG. 5, shaped memory alloy element 40 indirectly, through connection 49 with elongated flexible member 50, interferes with plunger 48.

As shaped memory alloy element 40 returns to its memory length, plunger 48 is free to move with respect to valve body 25. As shown in FIGS. 4 and 5 spring 33 normally urges closure body 31 toward rupture disk 35. The bias force of spring 33 can move plunger 48 out of groove 32 and allow closure body 31 to move toward rupture disk 35. As closure body 31 moves toward rupture disk 35, tubular member or bayonet 34 eventually pierces rupture disk 35 and allows pressurized fluid to flow from high pressure end 28 to low pressure end 29. Tubular member or bayonet 34 and closure body 31 can have a through hole, such as illustrated by the dashed lines in FIGS. 4 and 5, for passing the pressurized fluid through closure element 30.

FIGS. 4 and 5 illustrate another preferred embodiment of passageway 27. As shown in FIGS. 4 and 5, passageway 27 is oriented more linearly than passageway 27 as shown in FIGS. 1–3.

As shown in FIGS. 1–5, end portion 41 of shaped memory alloy element 40 is fixed with respect to valve body 25. In one preferred embodiment according to this invention, adjusting screw 43 can be used to fix end portion 41. It is apparent that any other suitable mechanical coupling or linkage can be used to fix end portion 41 with respect to valve body 25.

End portion 42 of shaped memory alloy element 40 is free. Thus, as shaped memory alloy element 40 reduces in length, for example, end portion 42 is free to withdraw from interference with closure element 30, plunger 48 or any other suitable mechanical element. As shown in FIG. 5, end portion 42 can be attached to elongated flexible member 50, such as a cable, which has a relatively constant length over the temperature range to which shaped memory alloy element 40 is exposed. Thus, movement of end portion 42 translates into movement of end portion 42 of elongated flexible member 50, such as shown in FIG. 5, so that in the closed position end portion 42 interferes with closure element 30, plunger 48 or any other suitable mechanical element.

Figure 6:
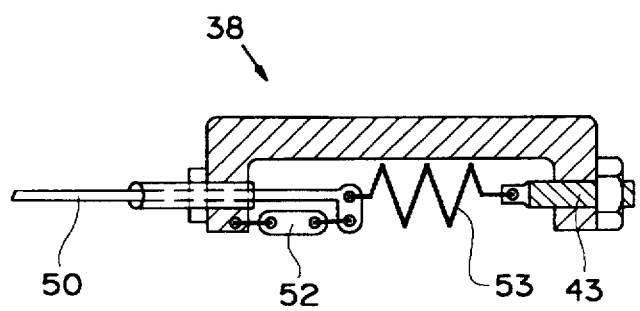
FIG. 6 is a partial cross-sectional view of a thermal triggering mechanism, according to another preferred embodiment of this invention.

FIG. 6 shows another preferred embodiment of thermal triggering mechanism 38, according to this invention. When fusible element 52 melts spring 53 can pull elongated flexible member 50, to the right as shown in FIG. 6, to accomplish the same result of eliminating interference by end portion 42.

Although the above specification describes PRD 20 operating in a normally-closed position, it is apparent that shaped memory alloy element 40 and the other elements described above can be used in a valve that is normally-closed. In the preferred embodiment of this invention wherein PRD 20 operates in a normally-closed position, the roles of various elements can be reversed as necessary so that the valve components interact to close the valve and to prevent communication between high pressure end 28 and low pressure end 29. For example, as shown in FIGS. 1 and 2, bias means could be positioned so that piston 44 is urged into the position shown in FIG. 1.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A pressure relief device comprising:
    a valve body having a passageway, said passageway having a high pressure end and a low pressure end, a closure element movable with respect to said valve body between an open position and a closed position, in said closed position said closure element preventing communication between said high pressure end and said low pressure end, in said open position said high pressure end in communication with said low pressure end; and
    a shaped memory alloy element detached with respect to said closure element, in said closed position said shaped memory alloy element forming an interference with movement of said closure element and retaining said closure element in said closed position, and in said open position said shaped memory alloy element deformed to eliminate said interference.

2. A pressure relief device according to claim 1 wherein said closure element comprises a piston, said piston is slidably mounted with respect to said valve body, and in said closed position at least a portion of said piston blocks said passageway.

3. A pressure relief device according to claim 1 wherein said closure element comprises a tubular member slidably mounted with respect to said valve body.

4. A pressure relief device according to claim 3 further comprising a rupture disk sealably mounted with respect to said valve body, and in said closed position said rupture disk preventing communication between said low pressure end and said high pressure end of said passageway.

5. A pressure relief device according to claim 4 wherein said tubular member ruptures said rupture disk as said closure element moves from said closed position to said open position.

6. A pressure relief device according to claim 1 wherein said shaped memory alloy element directly interferes with said closure element.

7. A pressure relief device according to claim 6 wherein at least a portion of said shaped memory alloy element abuts said closure element.

8. A pressure relief device according to claim 1 wherein said shaped memory alloy element indirectly interferes with said closure element.

9. A pressure relief device according to claim 8 further comprising a plunger slidably mounted with respect to said valve body, at least a portion of said plunger interferingly contacting said closure element.

10. A pressure relief device according to claim 9 wherein said shaped memory alloy element interferes with said plunger.

11. A pressure relief device according to claim 10 wherein said shaped memory alloy element indirectly interferes with said plunger.

12. A pressure relief device according to claim 1 wherein said shaped memory alloy element is elongated.

13. A pressure relief device according to claim 12 wherein one end portion of said shaped memory alloy element is fixed with respect to said valve body.

14. A pressure relief device according to claim 12 wherein one end portion of said shaped memory alloy element is secured with respect to an elongated flexible member.

15. A pressure relief device according to claim 14 wherein at least a portion of said elongated flexible member interferes with said closure element.

16. A pressure relief device according to claim 1 wherein said shaped memory alloy element is a rod.

17. A pressure relief device according to claim 1 wherein deformation of said shaped memory alloy element shortens a length of said shaped memory alloy element.

* * * * *